United States Patent [19]

Littell, Jr.

[11] 4,081,581
[45] Mar. 28, 1978

[54] LAMINATED AIRCRAFT WINDSHIELD

[75] Inventor: Harry E. Littell, Jr., Gibsonia, Pa.

[73] Assignee: PPG Industries, Inc., Pittsburgh, Pa.

[21] Appl. No.: 683,352

[22] Filed: May 5, 1976

Related U.S. Application Data

[63] Continuation-in-part of Ser. No. 456,925, Apr. 1, 1974, abandoned.

[51] Int. Cl.² .......................... E04C 1/00; B32B 27/36; B32B 27/40
[52] U.S. Cl. .......................... 428/138; 52/308; 52/616; 244/121; 244/129.3; 428/99; 428/137; 428/38; 428/34; 428/213; 428/214; 428/412; 428/424; 428/426; 428/447; 428/522; 428/911; 428/220; 428/267; 428/302; 428/272
[58] Field of Search .............. 161/165, 183, 192, 194, 161/404, 190; 428/911, 412, 425, 424, 426, 522, 138, 99, 213, 220, 415, 267, 272, 302, 38, 34, 137, 447, 214; 52/308, 309, 616; 244/121, 129 W; 298/84 R, 84 K

[56] References Cited

U.S. PATENT DOCUMENTS

| 2,567,353 | 9/1951 | Ryan | 52/208 |
|---|---|---|---|
| 3,061,490 | 10/1962 | Ryan | 428/38 |
| 3,388,032 | 6/1968 | Saunders | 428/412 |
| 3,424,642 | 1/1969 | Orcutt | 428/437 |
| 3,458,388 | 7/1969 | Moynihan | 428/424 |
| 3,549,476 | 12/1970 | Dietzel | 428/337 |
| 3,666,614 | 5/1972 | Snedeker | 428/429 |
| 3,671,370 | 6/1972 | Littel | 428/337 |
| 3,679,527 | 7/1972 | Crick | 428/34 |
| 3,681,167 | 8/1972 | Moore | 156/99 |
| 3,885,072 | 5/1975 | Zibritosky | 52/208 |

FOREIGN PATENT DOCUMENTS

| 1,315,489 | 5/1973 | United Kingdom. |
|---|---|---|
| 1,033,322 | 6/1966 | United Kingdom. |

Primary Examiner—Ellis Robinson
Attorney, Agent, or Firm—Edward I. Mates

[57] ABSTRACT

Disclosed are laminated windshields, preferably having an outer protective sheet of glass or plastic, at least two relatively thin structural sheet members of polycarbonate resin and interlayers of elastomeric resin interposed between and adhering said sheet and sheet members together. The thickness and material composition of the structural sheet members and interlayers are selectively correlated so that they function as an efficient energy absorber over a wide range of temperatures, such that forces emanating from a predesigned or preestablished impact on the outer sheet member are dissipated without penetration of the windshields.

36 Claims, 4 Drawing Figures

LAMINATED AIRCRAFT WINDSHIELD

CROSS REFERENCE TO RELATED APPLICATIONS

This application is a continuation-in-part of application Ser. No. 456,925 of Harry E. Littell, Jr., filed Apr. 1, 1974 for Laminated Aircraft Windshield, now abandoned.

BACKGROUND OF THE INVENTION

This invention relates to laminated window panels and especially to windshields of aircraft which are subject to high impact forces caused, for example, by accidental contact with birds in flight at high speeds. Window panels and windshields have been made of laminated glass and plastic which provide good optical properties and are also adaptable to withstand the substantial temperature differentials and pressurization to which modern aircraft are subjected. The windshield surface also has been of a protective material for resisting abrasion, chemical deterioration and thermal damage. All of these properties are required for aircraft windshields along with the restriction that the thickness and, accordingly, the weight of the windshields be kept to a minimum.

Although laminated window panels and windshields of an acceptable weight as used heretofore for aircraft have substantially met these requirements, it has been found that they have not been able to withstand the impact from an accidental collision with a bird when the aircraft is traveling at a high rate of speed. At high altitudes, this problem does not exist because birds are not able to fly above a certain height; however, this is a serious problem when aircraft are flying at low altitudes which is necessary for landing and takeoff. It is also necessary for aircraft to fly at low altitudes in certain situations as, for example, in low altitude military aircraft maneuvers.

With the window panel constructions used heretofore, it has been necessary to increase the thickness and weight substantially to provide efficient protection for aircrew members from bird impacts, especially at high speeds of from 250 knots to 500 knots and above where the forces generated by the impact of a bird are great enough to damage a windshield of more acceptable thickness and weight and permit penetration by the bird into the cockpit of the aircraft. This has presented a problem which is most serious in view of the consequences of an accident of this type of modern high speed aircraft.

DESCRIPTION OF THE PRIOR ART

U.S. Pat. No. 3,666,614 to Snedeker discloses a laminated windshield having a plurality of polycarbonate sheets bonded together by polymeric adhesive interlayer material. No thickness or attachment means is included in this patent.

U.S. Pat. No. 3,388,032 to Saunders discloses a glass-polycarbonate laminate. Polyurethane is disclosed as interlayer material for adhering the polycarbonate ply to glass.

U.S. Pat. No. 3,681,167 to Moore discloses a sheet of fused acrylic and polycarbonate which may be used as a protective layer in a laminated windshield.

U.S. Pat. No. 3,458,388 to Moynihan discloses laminated windows having an interlayer comprising a central ply of polycarbonate and two relatively soft adhesive layers. The adhesive layers are composed of polyurethane.

U.S. Pat. No. 3,424,642 to Orcutt discloses laminated glass-plastic windows containing interlayers which may extend beyond the edges of outer glass plies. The edge portion extending beyond the edges of the outer glass plies may contain one or more reinforcing frames or inserts that are securely mounted to a structural supporting frame.

Other patents that have been cited as pertinent in various novelty searches include U.S. Pat. No. 3,549,476 to Dietzel; U.S. Pat. No. 3,208,902 to Arond; U.S. Pat. No. 3,671,370 to Littell; U.S. Pat. No. 3,885,072 to Zibritosky; U.S. Pat. No. 2,567,353 to Ryan; British Pat. No. 1,033,322 to Orcutt; British Pat. No. 1,315,489 to I.C.I.; French Pat. No. 1,472,878 to Douglas (which corresponds to U.S. Pat. No. 3,558,408 to Hamilton et al); U.S. Pat. No. 3,573,150 to Broutman et al; U.S. Pat. No. 3,009,845 to Wiser and U.S. Pat. No. 3,508,987 to Buckley.

SUMMARY OF THE INVENTION

According to this invention, a laminated windshield construction of acceptable weight is provided having maximum impact resistance for a given weight and which is capable of withstanding high energy impacts as by an accidental collision with a bird at high speeds. With one preferred construction, an outer structural or non-structural protective sheet or ply of abrasion, chemical and thermal resistant material may be severely fractured or broken by impact of a bird; however, the propagation of the fracture or cracks through the windshield is minimized or prevented by an impact resistant structural sublaminate of at least two relatively thin sheets of polycarbonate resin interbonded to each other and to the outer protective sheet with interlayers of elastomeric resin. It has been found that this construction provides the necessary flexibility or energy absorption for impact resistance along with the necessary isolation of the protective sheet from the structural sublaminate sheet members to minimize the propagation of cracks which would permit penetration of the windshield by a bird.

As used herein, the term "structural" as applied to various plies, sheets or laminates is intended to mean that such plies, sheets or laminates are mounted in a manner such that they are intended to transmit loads imposed thereon directly to the airframe. Conversely, the term "non-structural" as used in the above connection refers to such members where they do not or are not primarily relied upon to transmit loads, such as impact loads, directly to the airframe.

With the construction of the present invention, the windshield can be mounted primarily by fastening marginal extensions of the structural sheet members of polycarbonate resin to the frame of the aircraft permitting the use of protective sheets on the outer and inner surfaces of the windshield which are non-structural or need not be required to carry the high loads (stresses and strains) caused by impact. Such loads can be more readily withstood by the sheets of polycarbonate resin in combination with one or more interlayers of elastomeric resin. However, this does not preclude the outer and/or inner plies from being structural plies or, alternatively, from being primarily non-structural plies. In a typical construction, the outer and/or inner plies may be mounted within or affixed to the airframe such that one or both are primarily intended to transmit non-impact loads to the airframe, such as loads caused by pressurization, but they may also contribute to some extent to transmitting impact loads to the airframe.

To the accomplishment of the foregoing and related ends, the invention, then, comprises the features hereinafter fully described and particularly pointed out in the claims, the following description and annexed drawings setting forth in detail certain illustrative embodiments of the invention, these being indicative, however, of but several of the various ways in which the principles of the invention may be employed.

DETAILED DESCRIPTION

Figure 1:
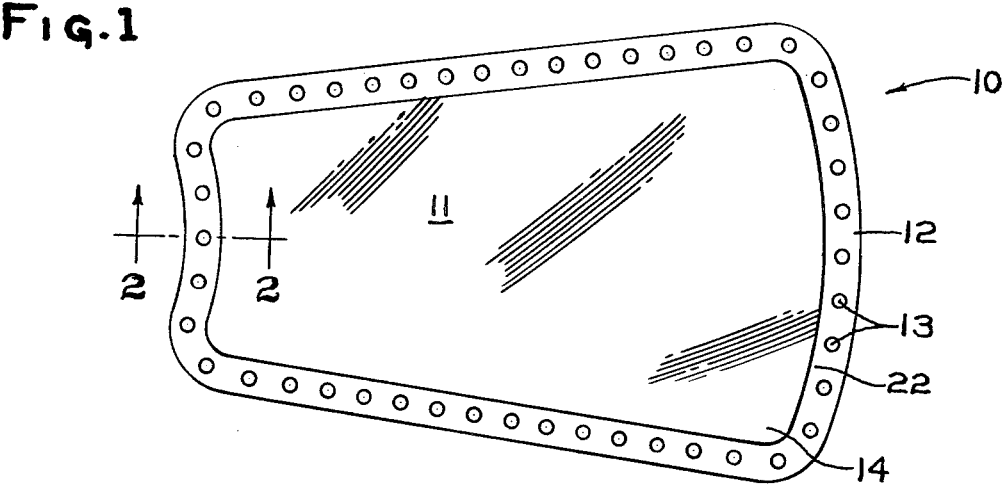
FIG. 1 is a schematic view in plan of a windshield embodying the invention.
Figure 2:
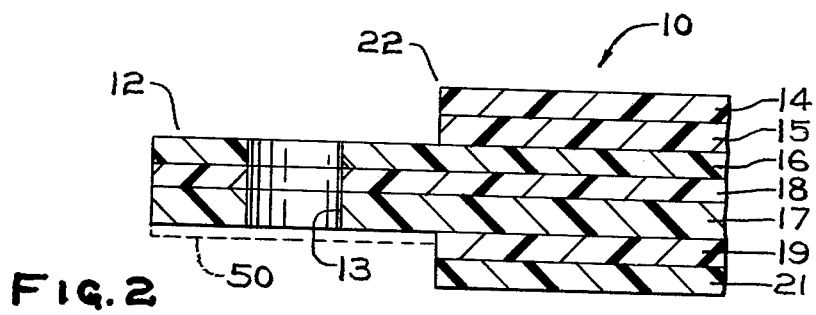
FIG. 2 is a sectional view taken along the plane of line 2—2 of FIG. 1 showing the construction of the panel with parts being broken away.

Referring to FIGS. 1 and 2, a laminated windshield 10 is shown having a center portion 11 which is transparent and an edge portion 12 for fastening to a suitable supporting structure such as a frame or other fuselage members of an aircraft, not shown. Bolt holes 13 may be provided at spaced-apart positions around the edge portion 12 through which bolts (not shown) may be disposed for fastening the edge portion of the windshield 10 to the aircraft fuselage. A bushing (not shown) may be installed in each aperture. Each bushing serves primarily to transmit the mounting load of the edge portion 12 to the suitable supporting structure through the thickness of the edge portion and not for transmitting a load parallel to the major surfaces of the window. Suitable bushings are composed of a lightweight material that is chemically inert at normal operating temperatures, such as aluminum and fiber glass, for example.

An outer protective sheet 14 is provided at the outer surface of the windshield 10 and is preferably of an abrasion, chemical and thermal resistant material. In this embodiment, the outer protective sheet is of acrylic resin, but it may be of glass or other rigid, transparent material such as the allyl diglycol carbonate disclosed in U.S. Pat. No. 2,370,565, and has a thickness of 0.060 inch. This material has a good resistance to abrasion and chemical degradation.

The outer protective sheet 14 is bonded to a first interlayer 15 of elastomeric resin, preferably polyurethane, having a thickness greater than 0.015 inch and in this embodiment has a thickness of 0.150 inch. A pair of structural sheet members are disposed under the outer protective sheet 14 and first interlayer 15 and in this embodiment include a first structural sheet member 16 and a second structural sheet member 17 separated and bonded to a second interlayer 18 of elastomeric resin such as polyurethane. The first and second structural sheet members 16 and 17 are made of polycarbonate resin. When the bushings are omitted from the bolt holes 13, the tensile load bearing capability of the edge portion 12 is not affected to a significant degree because tensile loads are almost entirely borne by the bolts and the polycarbonate structural sheet members 16 and 17.

The polycarbonate resin used for the structural sheet members 16 and 17 may be of a material akin to that disclosed in U.S. Pats. Nos. 3,028,365 and 3,117,019 and is preferably one of the polycarbonate resins commercially available under the trademarks "LEXAN" or "MERLON" from General Electric Company and Mobay Chemical Company, respectively.

The polyurethanes preferably used for the interlayers 15 and 18 can broadly be described as the reaction product of a polyisocyanate and a polyol which upon lamination forms a transparent interlayer. The polyurethanes may have thermosetting or thermoplastic properties, but preferably exhibit thermoplastic properties. Thus, for example, an organic diisocyanate is reacted with a relatively long chain diol and a curing agent which is usually a monomeric compound having at least two active hydrogens per molecule, as determined by the Zerewitinoff test described in Kohler, J. Am. Chem. Soc., 49, 3181 (1927). Suitable polyisocyanates are organic diisocyanates which include aromatic, aliphatic, cycloaliphatic and heterocyclic diisocyanates. Examples are 2,4- and 2,6-toluylene diisocyanate, 1,4-butane diisocyanate, 1,2-isocyanato-methyl cyclobutane, 4,4'-methylene-bis-(cyclohexyl isocyanate), 1,10-decane diisocyanate, and furfurylidene diisocyanate.

Suitable long chain diols include polyester diols. The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC-R-COOH wherein R is an alkylene radical containing from 2 to 12, and preferably 4 to 8, carbon atoms inclusive, examples of which are adipic, succinic, palmitic, suberic, azelaic and sebacic moieties. Suitable aliphatic diols contain from 2 to 15 carbon atoms, exemplary of which are ethylene glycol, 1,3-propanediol, 1,4-butanediol and 1,6-hexanediol. The average molecular weight of the polyester diol should be between 750 and 5000, preferably between 1000 and 3300. The preferred polyester diol is poly(1,4-butylene adipate) having a molecular weight of about 1800 to 2200.

With the thermoplastic polyurethanes the polyisocyanate and the long chain glycol are preferably reacted with a curing agent which has two active hydrogens per molecule. Preferred curing agents are aliphatic diols having from 2 to 15 carbon atoms such as ethylene glycol, 1,3-propane diol, 1,4-butanediol and 1,6-hexanediol. Aminoalcohols and diamines can also be employed. Examples include monoethanolamine and 1,2-ethanediamine.

The thermoplastic polyurethanes can be prepared by pre-reacting the organic diisocyanate (about 4 molar parts) with the mixture of diols (about 1 molar part long chain diol and 2.8 molar parts curing agent) for about 15 minutes at a temperature of from about 100° to about 120° C. and then cooling the reaction mixture to a temperature below about 30° C. in order to interrupt the reaction and produce a thermoplastic product which has free isocyanate groups. The plastic can then be extruded into film or thicker sheet form and thinner films of the required thickness skived from the sheets.

A more detailed description on the preparation of such polyurethanes can be found in Belgian Pat. No. 785,125, assigned to the assignee of the present invention and incorporated herein by reference.

The following Example will serve to illustrate the polyurethane material preferably used in the interlayers 15 and 18. All parts and percentages in said Example are by weight unless indicated to the contrary.

EXAMPLE

One mole of a poly(1,4-butylene adipate) polyester having a molecular weight of 1965, a hydroxyl number of 57 and a melting point of 51 and an acid number of 0.5 was dried with agitation in a glass reactor to remove trace amounts of water by heating to 100°–105° C. under 3 millimeters of mercury pressure for about 3 hours. The pressure was released while introducing pre-purified nitrogen and anhydrous 1,4-butanediol (2.71 moles, 0.03% H$_2$O) was added over a one minute period to the agitated mixture of polyester at 93° C., and the mixture heated to 95° C. in 15 minutes. The resulting mixture was homogeneous. To this homogeneous mixture was added over a one minute period 3.71 moles of 4,4'-methylene-bis-(cyclohexyl isocyanate) with a stereoisomer content of 19 to 21 percent trans, trans, 17 to 18 percent, cis, cis, and 62 to 64 percent cis, trans, and containing between 0.27 percent and 0.40 percent monoisocyanate, i.e., "HYLENE W" marketed by E. I. duPont deNemours & Co., Inc. and to which had previously been added 0.280 gram (0.01 percent of the total reactants) of dibutyltin dilaurate catalyst. The butanediol and diisoctanate were at 22° C. and the additions were both made while the reactor was under a nitrogen atmosphere. The resulting mixture was rapidly agitated for about one minute during which time the temperature of the mixture rose from 80° to 95° C. The mixture was poured into a dry Teflon coated reactor which was closed and placed in a 130° C. non-circulating continuous purged nitrogen oven (the temperature of the polymer was approximately 143° C.) for about 2 hours until the reaction and polyurethane formation was substantially complete. The NCO content of the polymer was 0.07 percent by weight as determined by infrared spectrometry. The resultant semisolid polymer was allowed to cool to room temperature, removed, cut and milled (front roll 180° F. and rear roll 135° F.) and calendered on a 3 roll mill (top roll 250° F., middle roll 225° F. and bottom roll 215° F.) into 35 mil sheets 14 inches in width. The polymer had an inherent viscosity at 30° C. at a 0.5 percent concentration in N-methyl-2-pyrrolidone of about 1.40 before milling and an NCO content of 0.07 percent. The inherent viscosity after calendering was approximately the same (1.41).

The polyurethane described hereinbefore may be exposed to a wide temperature range without degradation or embrittlement. It retains its resilient character even at −65° F. For example, at −65° F., the polyurethane described characteristically exhibits a percent elongation at failure of 175% compared to 30% for a heretofore used standard aircraft vinal (100 parts vinyl butyral plasticized with 21 parts triethylene glycol di-2-ethyl butyrate). It also has good high temperature strength properties at temperatures as high as 150° to 200° F. and higher. At 150° F., for example, it exhibits a tensile strength of greater than 1,000 psi. whereas the above referred to vinyl exhibits a tensile strength of only about 450 psi. Accordingly, the described polyurethane represents a preferred interlayer material, although other interlayer materials which exhibit good tensile strength retention and embrittlement resistance over a relatively wide range of temperatures, such as silicone interlayer material, are also within the contemplation of this invention.

Preferably, the structural sheet members 16 and 17 are relatively thin and may have a thickness of from 0.060 inch, more preferably, from 0.090 inch to 0.250 inch. It has been found that the polycarbonate resin described hereinabove has good impact resistance at thicknesses within the range of 0.090 inch to 0.250 inch when used in laminated windshields of this type. At greater thicknesses, the impact resistance has been substantially reduced and therefore it is important to incorporate in the windshield substantially thin sheets rather than a single thick sheet of polycarbonate to obtain the maximum impact resistance with the minimum windshield weight. In this embodiment, the first structural sheet member 16 has a thickness of approximately 0.125 inch and the second structural sheet member 17 has a thickness of approximately 0.188 inch.

The second interlayer 18 is of the same elastomeric resin or polyurethane as the first interlayer 15 and has a thickness of 0.090 inch.

The first interlayer 15 is bonded to the first structural sheet member 16. A third interlayer 19 is disposed between the second structural sheet member 17 and an inner surface sheet 21 of polycarbonate resin having a thickness of approximately 0.125 inch. The third interlayer 19 is also of an elastomeric resin such as polyurethane and has a thickness of 0.150 inch.

As shown in FIGS. 1 and 2, the outer protective sheet 14 and inner surface sheet 21, which may be glass, acrylic, the aforesaid allyl diglycol carbonate resin or other rigid, transparent material, as well as the first interlayer 15 and third interlayer 19 terminate short of the edge portion 12 at a margin 22 of the center portion 11. The first structural sheet member 16 and second structural sheet member 17 as well as the second interlayer 18 extend outwardly from the margin 22 into the edge portion 12 and contain the bolt holes 13 for receiving attaching bolts (not shown).

As is clearly shown in FIG. 2, the structural sheet members 16 and 17 and the second interlayer 18, whose portions extending outwardly from the margin 22 comprise the edge portion 12 of this embodiment, are free of any interior reinforcement. The windshield shown in the drawings is of a construction suitable for testing and it is understood that the windshield edge attachment may be modified to meet the design requirement for specific aircraft. For example, reinforcing straps may be adhered to the structural plies and inserts may be included in edge attachment portions of the interlayers. Reinforcing straps or frames may also be attached to or surround the facing (inner or outer) plies to primarily assist in carrying specific, non-impact design or service loads. For more specific disclosure of such conventional modifications reference is made to the constructions described and shown in the U.S. Pat. Nos. 3,424,642 to Orcutt; 3,885,072 to Zibritosky and 3,919,022 to Stefanik, all assigned to applicant's assignee and incorporated herein by reference.

While it is preferred that such interior reinforcements be omitted, particularly in the interlayers 15 and 18, to control costs and weight, if reinforcements are included, they most likely are needed to reinforce the apertures rather than to transmit loads parallel to the major surfaces of the window, and it is preferred to install one or more additional members 50 that are lightweight and that have a coefficient of thermal expansion compatible with that of polycarbonate against a surface of one or more polycarbonate plies as needed to improve the tensile strength of the apertured area in the edge portion 12 and guard against failure due to differences in pressure on opposite major surfaces of the window. A typical additional member 50 is shown in phantom as it is an optional element of the various illustrative embodiments. Such additional members are about 20 mils (0.5 millimeter) thick and may be composed of woven nylon fabric impregnated with an epoxy binder capable of withstanding temperatures normally encountered under operating conditions of the window. Each additional member used is bonded to a surface of a polycarbonate ply in the edge portion thereof using a suitable adhesive, such as a silicone adhesive, which may be vulcanizable by heat or at room temperature, or a polyurethane adhesive or a polysulfide adhesive or any other adhesive compatible with polycarbonate and the composition of the additional member. If an additional member is installed against an interior surface of a structural sheet member, the thickness of the polyurethane interlayer is reduced in its edge portion to receive the additional member and said suitable adhesive is applied to the additional member surface that faces the polycarbonate structural sheet member. No adhesive is required for the interfacial surface between the additional member and polyurethane.

With this construction, the forces emanating from an impact against the outer protective sheet 14 are transmitted to the structural sheet members 16 and 17 and through them to the aircraft fuselage. This is desirable because the relatively thin structural sheet members 16 and 17 have the impact resistance necessary to withstand the forces transmitted to or through them. It has also been found that when the impact of an object such as a bird against the outer protective sheet 14 causes cracks in the outer sheet or other ply, there is a minimum of propagation of the cracks from such ply through the windshield 10 of this construction. The interlayers 15, 18 and 19 not only bond the outer and inner sheets 14, 21 and the structural sheet members 16, 17 together into a unitary structure but also isolate the members which deters propagation of cracks preventing failure and penetration of the windshield 10.

Figure 3:
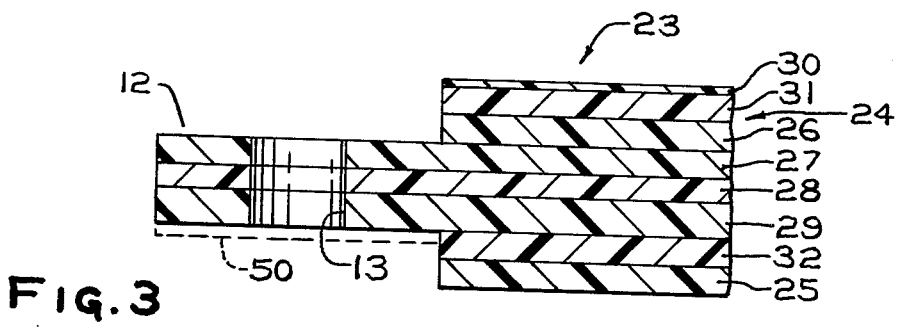
FIG. 3 is a sectional view like FIG. 2 showing a modification of the invention.

Referring to FIG. 3, a sectional view of a windshield 23 having a modified construction is shown in which an outer protective sheet 24 is fused acrylic/polycarbonate having a thickness of approximately 0.185 inch and an inner surface sheet 25 is of acrylic resin having a thickness of approximately 0.125 inch. In all other respects, the windshield 23 has the same construction as the windshield 10 shown in FIGS. 1 and 2. A first interlayer 26 is of polyurethane having a thickness of approximately 0.150 inch. A first structural sheet member 27 is of polycarbonate resin having a thickness of approximately 0.125 inch. A second interlayer 28 is of polyurethane resin having a thickness of approximately 0.090 inch. A second structural sheet member 29 is of polycarbonate resin having a thickness of approximately 0.188 inch and a third interlayer 32 is of polyurethane resin having a thickness of approximately 0.060 inch. The outer sheet 24 has a layer 30 of acrylic and a layer 31 of polycarbonate resin having thicknesses of approximately 0.060 inch and 0.125 inch, respectively. With the construction of FIG. 3, the outer protective sheet 24 of fused acrylic/polycarbonate provides resistance to abrasion, chemical degradation and temperature differentials to which the windshield 23 may be subjected in use. The inner surface sheet 25 of acrylic resin provides resistance to abrasion and harmful chemicals at the inside of the windshield protecting the structure at both sides thereof.

In this embodiment, the structural sheet members 27 and 29 and the second interlayer 28, like the corresponding structural sheet members 16 and 17 and the second interlayer 18 of the FIG. 2 embodiment, are free of any interior reinforcement, particularly in the edge portion 12, as is clearly shown in FIG. 3. However, in this embodiment, while it is preferred that interior reinforcements be omitted, they may be included. However, additional members 50 of the type previously described with their method of attachment to the structural sheet members of the previous embodiment are optionally included and are preferred to the interior reinforcements previously described.

In operation, the structural sheet members 27 and 29 provide the required impact resistance and the interlayers 26, 28 and 32 not only bond the members into a unitary structure but isolate the members so that cracks in any ply caused by impacts against the windshield will not propagate throughout the windshield which may cause failure and penetration.

Figure 4:
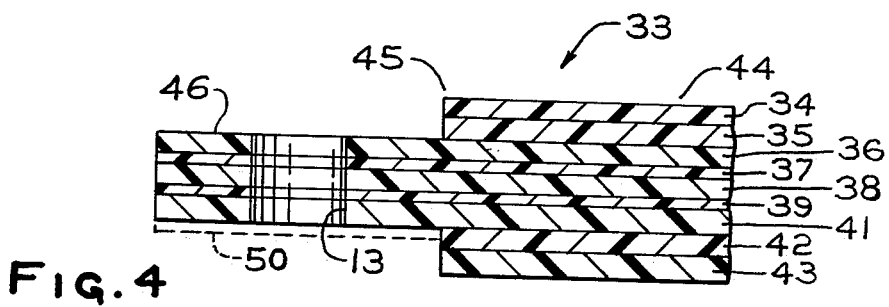
FIG. 4 is a section like FIG. 2 showing a further modification of the invention.

Referring to FIG. 4, a further modification is shown in which a windshield 33 has an outer protective sheet 34 of acrylic resin with a thickness of approximately 0.125 inch. A first interlayer 35 of polyurethane resin has a thickness of approximately 0.150 inch and is bonded to the outer protective sheet 34 and a first structural sheet member 36 of polycarbonate resin having a thickness of approximately 0.125 inch. A second interlayer 37 of polyurethane resin having a thickness of approximately 0.030 inch is bonded to the first structural sheet member 36 and to a second structural sheet member 38 of polycarbonate resin having a thickness of approximately 0.093 inch.

A third interlayer 39 of polyurethane resin having a thickness of approximately 0.030 inch is bonded to the second structural sheet member 38 and to a third structural sheet member 41 of polycarbonate resin having a thickness of approximately 0.125 inch. A fourth interlayer 42 of polyurethane resin having a thickness of approximately 0.090 inch is bonded to the third structural sheet member 41 and to an inner surface sheet 43 of polycarbonate resin having a thickness of approximately 0.125 inch. The windshield 33 has a center portion 44 with a margin 45 adjacent an edge portion 46 extending outwardly from the margin. The outer protective sheet 34, first interlayer 35, fourth interlayer 42 and inner surface sheet 43, as shown, terminate at the margin 45 whereas the structural sheet members 36, 38 and 41 and the interlayers 37 and 39 extend outwardly into the edge portion 46 for attachment to the aircraft fuselage as by bolts (not shown) extending through bolt holes 13 in the edge portion.

The FIG. 4 embodiment is similar to those of FIGS. 2 and 3 in that the structural sheet members 36, 38 and 41 and the second and third interlayers 37 and 39, which extend outwardly into the edge portion 46, are free of any interior reinforcement, particularly in the edge portion 46, as clearly depicted in FIG. 4. While such interior reinforcement may be provided if desired, it is preferred that any optional reinforcement, if added, be in the form of an additional member 50, shown in phantom, for reasons stated previously. Although the embodiment shown does not indicate any structural support for plies other than plies 36 to 39 and 41, this does not preclude, as aforesaid, the provision of some structural support therefor.

EXAMPLE

A windshield assembly like that shown in FIGS. 1 and 2 may be assembled by fabricating a prebent backing plate of glass. The inner surface sheet 21 is preformed and precut, blown clean with an antistatic air gun and placed on the matching backing plate. Matching spacers of plastic or other suitable material cut to fill the void at the edges of sheet 21 and interlayer 19 are placed in position. The spacers have a thickness equal to the thickness of the inner surface sheet 21 and the third interlayer 19.

The third interlayer 19 is laid in place in layers of approximately 0.030 inch to reach the design thickness of 0.150 inch. Each layer is precut to the desired design size. The second structural sheet member is also preformed and precut and then placed on the third interlayer 19. The second interlayer 18 is then laid in place in layers to reach the design thickness of 0.090 inch. The first structural sheet member 16 which is also preformed and precut is then placed on the second interlayer 18. Spacers cut to fill the void at the edges of sheet 14 and interlayer 15 are placed in position. The spacers have a thickness equal to the thickness of sheet 14 and interlayer 15.

The first interlayer 15 is laid in place in layers to reach the design thickness of 0.150 inch. The outer protective sheet 14 is preformed and precut before assembly and then placed on the first interlayer 15 after which a matching prebent backing plate is then placed on top of the assembly.

The entire sandwich is taped together with an adhesive paper tape and wrapped in a double layer of polyvinyl fluoride film with holes in the package to facilitate evacuation. The final step of construction includes placing the existing package in a flexible bag of laminated polyethylene and polytetrafluoroethylene about 5 mils thick, evacuating the bag, and heat sealing the opening. A second bag is applied in the same manner to complete the package.

The entire package is then placed in an air autoclave and the pressure increased. The temperature of the autoclave is ambient during pressurization up to 50 psi. Heat is applied at 50 psi and increased to 275° F. in 30 minutes when the pressure is approximately 125 psi. The temperature is held at 275° F. for 45 minutes while the pressure is further increased to 160 psi. The autoclave is then cooled to 200° F. in 15 minutes; cooled to 150° F. in 15 minutes and then cooled at ambient temperature in 30 minutes before releasing the pressure. The laminated assembly is then removed from the autoclave, stripped from the bags and film wrapping and masked with adhesive paper ready for subsequent finishing and inspection. With this construction, the relatively thin structural sheet members of polycarbonate resin are in a thickness range where they have optimum impact strength.

In FIG. 4, structural sheet members 36, 38 and 41 are bonded together by interlayers 37 and 39 of polyurethane resin having a good low temperature embrittlement resistance to provide flexibility and impact resistance to the windshield 33 with the transfer of impact forces against the outer protective sheet 34 to the fuselage structure occurring through the structural sheet members at the edge portion 46. The thickness of the polyurethane first interlayer 35, second interlayer 37 and third interlayer 39 are sufficient to isolate the outer protective sheet 34 and structural sheet members 36, 38 and 41 so as to deter propagation of cracks, emanating from any ply, throughout the windshield, thereby providing a fail-safe structure capable of withstanding extremely high impact stresses.

The windshields 10, 23 and 33 shown in FIGS. 1 through 4, have inner surface sheets 21, 25 and 43 that, although not essential, do not extend into the edge portions 12 and 46. The inner surface sheets 21, 25 and 43 are bonded to interlayers 19, 32 and 42 of elastomeric resin such as polyurethane having a thickness sufficient to make each of the inner surface sheets a unitary part of the respective windshields while at the same time isolating them from stringent support by the other members to thereby tend to minimize or prevent the ejection of material spalling from the inner surface of the windshield which is highly undesirable because of the possible injury to the aircrew members.

With this design, tests have shown that bird impact hits at the center of the windshield or at the edges may produce forces which may cause cracking of one of the rigid sheets, particularly the outer protective sheet; however, the construction of the invention distributes these forces in such a manner that there is a minimum propagation of the cracks through the structure.

The windshield construction was tested by shooting a 4-pound bird from an air cannon at a full size curved windshield panel mounted in a frame with the area of impact at an angle of 22° from the line of flight of the bird. Tests were also made by shooting a bird at a flat test panel 26 inches by 26 inches mounted at an angle of 25° from the line of flight. The speed at which the birds were propelled was controlled as was the temperature of the panels. Excellent correlation was found between the penetration resistance results of the test panel and the full size windshield.

Designs of the type shown in FIG. 1 and FIG. 2 stopped birds at speeds from 495 to 706 knots at temperatures from 20° to 72° F. when the impact was against the center and corner of the panel.

For example, a windshield of the FIG. 2 construction was successfully tested under the following conditions with these results:

Full size curved windshield
    39 inch back arch
    24 inch forward arch
    52 inch beam
    45 inch sill
    Temperature — 72° F.
    Velocity of bird — 706 knots
    Impact at center
    Angle — 22°
    4-pound bird Results: The outer protective sheet 14 of acrylic resin was fractured. Three rear arch bolts were blown off. Bird did not penetrate.

In another test, a test panel of the FIG. 4 construction was tested under the following conditions with these results:

Test panel 26 inches × 26 inches
    Temperature — 61° F.
    Velocity of bird — 496 knots
    Impact at center
    Angle — 25°
    4-pound bird Results: The outer protective sheet 14 of acrylic resin cracked, with no center bulge in panel. Bird did not penetrate.

For a comparison of performance, 26 inches by 26 inches, 0.953 inch thick flat panel of the FIG. 2 construction (0.125 inch acrylic outer ply — 0.150 inch polyurethane interlayer — 0.125 inch polycarbonate ply — 0.090 inch polyurethane interlayer — 0.188 inch polycarbonate ply — 0.150 inch polyurethane interlayer — 0.125 inch polycarbonate inner ply) weighing 5.9 pounds per square foot and mounted at 25° from the line of flight stopped a 4-pound bird at 509 knots without penetration. On the other hand, a conventional tempered glass panel construction (0.110 inch tempered glass outer ply — 0.1 inch cast urethane interlayer — 0.5 inch tempered glass ply — 0.1 inch cast urethane interlayer — 0.5 inch tempered glass ply — 0.1 inch cast urethane interlayer — 0.110 inch tempered glass inner ply) which stopped a 4-pound bird in an identical test was almost 60 percent thicker and weighed 17.7 pounds per square foot, approximately three times that of the new design. Also a 26 inches by 26 inches glass-faced stretched acrylic laminate (0.187 inch tempered glass outer ply — 0.1 inch cast urethane interlayer — 0.750 inch stretched acrylic ply — 0.3 inch cast urethane interlayer — 0.125 inch polycarbonate inner ply) having a total thickness of 1.46 inches and almost twice as heavy as the new construction (10.2 pounds per square foot) was demolished when hit by a 4-pound bird at the same angle at 531 knots.

These results were obtained with a relatively light construction having dimensions within the parameters set forth hereinabove and thereby making maximum use of the strength and impact resistance properties of the polycarbonate resin as well as the elastomeric properties of the polyurethane resin and the protective properties of the acrylic resin, glass or other rigid transparent materials.

The above tests were carried out at moderate temperatures; however, the construction of the invention provides good impact resistance at high and low temperatures also. A wide temperature service range of the polyurethane resin material described hereinabove is important in obtaining these results. The excellent low temperature embrittlement resistance and high temperature strength properties of the interlayer are evident from comparative impact tests on test panels containing the polyurethane resin material and panels containing other interlayer materials. One type of impact test which has shown to provide good correlation with bird impact involves striking a panel of a certain material or composite with a falling ball or fired missile.

Tests of this type were conducted in which the test panels were 12 inches by 12 inches with an outer sheet of glass having a thickness of 0.110 inch, an interlayer having a thickness of 0.120 inch and an inner sheet of polycarbonate having a thickness of 0.125 inch.

In these tests, a 150 gram urethane-faced titanium missile was fired at the panels from an air cannon at varying temperatures. In the tests on the polyurethane resin and two other interlayer materials the following results were obtained when the missile was fired at a nominal speed of 285 miles per hour.

A panel with an interlayer of polyurethane material described hereinabove resisted penetration at temperatures down to 16° F. and up to at least 193° F. before testing was stopped.

By comparison, panels with an interlayer of ethylene terpolymer (manufactured by Monsanto Research Corporation) were penetrated at 16° F. and 180° F.

In an additional comparative test, panels with an interlayer of polyvinyl butyral (37½ parts tricresyl phosphate plasticizer/100 parts vinyl) were penetrated at 86° F. and had to be heated to a higher temperature of approximately 121° F. in order to resist penetration.

Additional impact tests were performed by impacting birds having a nominal weight of 4 pounds against four additional transparent laminates. All the additional laminates tested were square, had their outer and inner acrylic plies primed with a polyurethane solution in chloroform and were 26 inches long (about 66 centimeters) along each edge and installed at a 45° angle to the direction of impact. The first two additional laminates were composed of an outer ply of acrylic resin 0.080 inch (about 2 millimeters) thick, a ply of polyurethane 0.030 inch (about 0.76 millimeter) thick, a ply of polycarbonate 0.188 inch (about 4.78 millimeters) thick, a ply of polyurethane 0.030 inch (about 0.76 millimeter) thick, a ply of polycarbonate 0.125 inch (about 3.2 millimeters) thick, and an acrylic resin inner ply 0.080 inch (about 2 millimeters) thick.

In the first two laminates, the polycarbonate ply outlines were coextensive with the laminate, while the acrylic plies were smaller than the laminate, as depicted in FIG. 2. The third and fourth additional laminates tested differed from the first two laminates in that in the third and fourth additional laminates, the apertured marginal portion of the polycarbonate plies were not a unitary part of the polycarbonate plies, but were composed of polycarbonate spacers of the same thickness as the plies aligned in the same plane and separated from the central portions of the respective polycarbonate plies by thin bumper strips by polyurethane. Each major surface of each polycarbonate ply was reinforced from the outer edge of the outer and inner plies by 20 mil thick (about 0.05 millimeter) straps of woven nylon fabric impregnated with an epoxy binder sold under the trademark NOMEX bonded to the major surfaces of the adjacent polycarbonate plies with silicone impregnated fabric 0.010 inch (0.25 millimeter) thick sold as PERMACEL P-5260Q. The central ply of the third laminate was 0.090 inch thick (about 2.3 millimeters) except for its marginal portion that was reduced to 0.030 inch (about 0.76 millimeter) to accommodate the thickness of the tapes of impregnated nylon silicone impregnated fabric. The fourth laminate had a central polyurethane ply 0.150 inch (3.87 millimeters) thick containing a steel mesh 0.025 inch (0.64 millimeter) thick in its mid-plane in its marginal portion beyond the edges of the outer and inner acrylic plies.

The summaries of the additional impact tests are as follows:

First test laminate:
Thickness 0.563 inch (14.3 millimeters)
Impact speed: 258 knots
Temperature at impact: 68° F. (20° C.)
Bird weight: 1881 grams The bird did not penetrate. The inbound acrylic ply was completely clear. There was no spall whatsoever. There was not even much sign of delamination between the acrylic and the polyurethane inner ply at cracks in the polyurethane inner ply. The outer acrylic ply had cracks between its bolt holes. Five bolts were sheared off along the top edge and another six bolts were badly bent. The outer acrylic ply had very little damage. Movies showed less than 4 inch (100 millimeter) deflection.

Second test laminate:
Thickness 0.563 inch (14.3 millimeters)
Impact speed: 356 knots
Temperature at impact: (62° F. (17° C.)
Bird weight: 1881 grams The bird did not penetrate. Three pieces of inner sheet of acrylic were removed by impact (two approximately ½ by ¼ inch 12 millimeters by 18 millimeters and one approximately ½ by 1½ inch — 12 millimeters by 37 millimeters). The acrylic was crushed along top edge indicating contact with frame during deflection. Considerable removal of acrylic from outer acrylic ply (a typical result of impact at this speed). Very little delamination at interface between the cracked acrylic and the outer polyurethane ply. No cracks continued into the polyurethane. All bolts were sheared along top edge and almost all others were bent.

Third test laminate:
Thickness 0.623 inch (15.8 millimeters)
Impact speed: 255 knots
Temperature at impact: 79° F. (26° C.)
Bird weight: 1894 grams Bird just penetrated. Polycarbonate plies sheared out in central section along top and right edges. The other two edges were still held by the NOMEX straps. The 30 mil thick polyurethane plies tore approximately in line with the edge of the straps where the polycarbonate plies sheared. The polycarbonate plies were undamaged. There was some debonding of the Permacel impregnated fabric from the polycarbonate spacers along the top edge. Movies showed little tissue through on initial contact, then slight amount from deflection on rebound. This test laminate compared unfavorably with the first test laminate impacted at approximately the same impact speed.

Fourth test laminate:
Thickness 0.683 inch (17.3 millimeters)
Impact speed: 322 knots
Temperature of impact: 76° F. (24° C.)
Bird weight: 1938 grams Bird penetrated. Polycarbonate plies pushed through in top half of laminate. Increased thickness of center polyurethane ply and wire mesh reinforcement did not help. The inner polycarbonate ply (0.125 inch—3.2 millimeters thick) sheared in line with acrylic along top edge. Also, there was additional cracking of polycarbonate ply. There was no spall in acrylic. The polyurethane tore in line with the boundaries between the NOMEX straps and the acrylic plies. Several mesh strands remained in polyurethane ply on right edge, but provided little contribution to impact resistance. This test laminate was inferior to the second test laminate which resisted penetration at even a higher impact velocity.

Comparisons of the results of testing additional laminates 1 and 3 with the results of testing additional laminates 2 and 4 indicate the need to have the thin polycarbonate plies extend continuously the entire extent of the structural sublaminate including its apertured marginal extensions attached directly to mounting surface in order to improve the resistance to impact of the laminated windshield that results.

Other laminates subjected to the 4 pound bird impact test and the results of these impact tests are:

1. A full sized curved windshield panel of the type previously described comprising a layer 0.060 inch (1.5 millimeter) thick of as-cast acrylic resin fusion bonded to a layer of polycarbonate 0.125 inch (3.2 millimeters) thick, a layer of polyurethane 0.100 inch (2.54 millimeters) thick and an inner layer of pressed polycarbonate 0.375 inch (9.5 millimeters) thick, installed at a 22° angle from the horizontal, was penetrated by a bird of 4 pounds nominal weight impacting at a velocity of 496 knots, with a bird-size hole in the center and considerable polycarbonate fracturing.

2. Another curved windshield panel installed at a 22° angle from the horizontal and comprising a layer of as-cast acrylic resin 0.125 inch (3.2 millimeters) thick fused to a layer of polycarbonate 0.75 inch (19 millimeters) thick developed a large jagged hole when impacted with a bird weighing 4 pounds at an impact velocity of 500 knots.

3. A test panel 26 inches (66 centimeters) square installed at a 25° angle to the horizontal and comprising an outer layer of acrylic resin 0.125 inch (3.2 millimeters) thick bonded by a thin film of a hydrolyzed ethyl silicate adhesive to a layer of polyurethane 0.180 inch (4.6 millimeters) thick, a layer of polycarbonate 0.250 inch (6.35 millimeters) thick, a layer of polyurethane 0.090 inch (2.3 millimeters) thick and an inner layer of polycarbonate 0.250 inch (6.35 millimeters) thick containing an aluminum frame embedded in the polyurethane layer separating the two polycarbonate layers was not penetrated by a bird weighing approximately 4 pounds impacting at a velocity of 500 knots. However, the inboard polycarbonate ply sheared in line with the edge of the insert along the top edge of the laminate.

4. An additional test panel having the same square outline as the previous test panel installed at an angle of 45° to the horizontal and comprising an outer ply of acrylic resin 0.125 inch (3.2 millimeters) thick bonded by a thin film of the hydrolyzed ethyl silicate adhesive to a layer of polyurethane 0.180 inch (4.6 millimeters) thick, which in turn was bonded to a layer of polycarbonate 0.625 inch (15.9 millimeters) thick was penetrated by a bird weighing about 4 pounds that impacted at 401 knots.

5. An additional curved windshield installed at a 22° angle to the horizontal having an outer ply of acrylic resin 0.125 inch (3.2 millimeters) thick bonded with a thin film of the hydrolyzed ethyl silicate adhesive to a layer of polyurethane 0.180 inch (4.6 millimeters) thick, a polycarbonate layer 0.250 inch (6.35 millimeters) thick, a polyurethane layer 0.060 inch (1.5 millimeter) thick and an inner polycarbonate layer 0.250 inch (6.35 millimeters) thick was impacted with a bird weighing approximately 4 pounds at an impact speed of 414 knots, with some rear arch shearing, which allowed a small quantity of bird tissue to extrude, and developed a slight cracking of the interior polycarbonate layer. The bird strike would probably not have prevented completion of a mission, because there was fair residual visibility after the test. It would appear from this test that this laminate comprised polycarbonate layers having individul thicknesses at approximately the upper limit of thickness permitting the laminate to barely pass the impact test.

The last five impact tests demonstrated the relative inferiority of the impact resistance properties of polycarbonate laminates provided with a thick layer of polycarbonate thicker than 0.250 inch compared to those having a plurality of polycarbonate plies, the thickness of each of which did not exceed 0.250 inch and established that the upper limit of thickness for each of the polycarbonate layers in laminates having adequate penetration resisting properties is approximately 0.250 inch.

Although the examples and embodiments of the invention incorporating two and three structural sheet members of relatively thin polycarbonate resin have been shown and described, additional structural sheet members may be used in practicing this invention without departing from the concept of the invention as set forth hereinabove. Also, the outer protective sheet and inner sheet may, for example, be of glass, polycarbonate resin, fused acrylic/polycarbonate resins, acrylic resins, polyurethanes and allyl diglycol carbonate resins; however, other materials having the necessary resistance to abrasion, chemical degradation and thermal damage may be used.

The present invention has been described with reference to the specific details of the embodiment described and shown. However, it is not intended that such details shall be regarded as limitations upon the scope of the invention except insofar as they are included in the accompanying claims.

I claim:

1. A transparent laminated window having high impact resistance adapted for mounting on a support structure, said window comprising an outer protective sheet or ply of an abrasion resistant, chemical resistant and thermal resistant material selected from the group consisting of glass and plastic and a sublaminate comprising a plurality of thin, transparent, structural sheet members of polycarbonate resin each having a maximum thickness of 0.250 inch, elastomeric resinous interlayer material selected from the group consisting of polyurethanes and silicones which exhibit good tensile strength retention and embrittlement resistance over a wide range of temperatures disposed between and bonded to said structural sheet members, said structural sheet members and said elastomeric resinous interlayer material extending beyond the edge of said outer protective sheet to form edge portions integral therewith for mounting of the window to said support structure, said structural sheet members and said interlayer material having aligned spaced apertures in said edge portions and adapted for alignment with spaced apertures on said support structure for said window for receipt of edge attachment means applied only through said apertures when aligned to rigidly secure said edge portions to said support structure for said window such that loads imposed on said window are transferred from said window to said support structure through said structural sheet members and said edge attachment means, and interlayer material selected from said group bonding said outer protective sheet or ply to said sublaminate.

2. A window according to claim 1, wherein said structural sheet members have a thickness of from about 0.060 to about 0.250 inch.

3. A window according to claim 1, wherein said interlayer material comprises a polyurethane resin having a thickness greater than 0.015 inch.

4. A window according to claim 1, wherein said structural sheet members have a thickness of from about 0.09 to about 0.2 inch and said interlayer material comprises a polyurethane resin.

5. A window according to claim 4, wherein said polyurethane resin is the reaction product of an organic diisocyanate, a polyester diol having an average molecular weight of between 750 and 5000 and an aliphatic diol having from 2 to 15 carbon atoms.

6. A window according to claim 1, further comprising wherein elastomeric polyurethane interlayer material bonded to said outer protective sheet and to one of said structural sheet members, and an inner surface sheet of an abrasion resistant, chemical resistant and thermal resistant material selected from the group consisting of glass and plastic and elastomeric resinous interlayer material bonded to said inner surface sheet and to another of said structural sheet members.

7. A window according to claim 6, wherein said interlayer of polyurethane resin has a thickness greater than 0.015 inch.

8. A window according to claim 7, wherein said polyurethane resin is the reaction product of an organic diisocyanate, a polyester diol having an average molecular weight of between 750 and 5000 and an aliphatic diol having from 2 to 15 carbon atoms.

9. A window according to claim 6, wherein said outer protective sheet and said inner surface sheet are composed of glass.

10. A window according to claim 9, wherein elastomeric resinous interlayer material is bonded to said outer protective sheet of glass and to one of said structural sheet members.

11. A window according to claim 1, which further includes an inner surface sheet of glass and elastomeric resinous interlayer material bonded to said inner surface sheet and to one of said structural sheet members.

12. A window as in claim 1, wherein said outer protective sheet is composed of glass.

13. A window as in claim 1, wherein said outer protective sheet is composed of acrylic resin.

14. A window as in claim 1, wherein said outer protective sheet is composed of fused acrylic/polycarbonate.

15. A transparent laminated window having high impact resistance adapted for mounting on a support structure, said window comprising an outer protective sheet or ply of an abrasion resistant, chemical resistant and thermal resistant material selected from the group consisting of glass and plastic, a first interlayer of elastomeric resin selected from the group consisting of polyurethanes and silicones which exhibit good tensile strength retention and embrittlement resistance over a wide range of temperatures adhered to said outer protective sheet, a pair of thin, transparent, structural sheet members of polycarbonate resin each having a maximum thickness of 0.250 inch, a second interlayer of elastomeric resin selected from said group disposed between and bonded to said structural sheet members, said first interlayer of elastomeric resin being adhered to one of said structural sheet members, and said first interlayer and said second interlayer of elastomeric resin having a thickness greater than 0.015 inch, whereby the propagation of cracks caused by impact on said outer protective sheet is minimized, said structural sheet members and said second interlayer of elastomeric resin extending continuously beyond the edge of said outer protective sheet to provide aligned edge portions integral therewith for mounting of the window to said support structure, said structural sheet members and said interlayer material having aligned spaced apertures in their edge portions and adapted for alignment with spaced apertures on said support structure for said window for receipt of edge attachment means applied only through said apertures when aligned to rigidly secure said edge portions of said structural sheet members and said interlayers to said support structure for said window such that loads imposed on said structural sheet members are transferred from said structural sheet members to said support structure through said edge attachment means.

16. A window according to claim 15, wherein said structural sheet members have a thickness from about 0.090 to about 0.250 inch.

17. A window according to claim 15, wherein said first interlayer and said second interlayer are comprised of a polyurethane resin, each said interlayer having a thickness greater than 0.015 inch.

18. A window according to claim 15, wherein said outer protective sheet is acrylic resin.

19. A window according to claim 17, wherein an inner surface sheet of polycarbonate resin is disposed on the opposite side of said pair of structural sheet members from said outer protective sheet and a third interlayer of polyurethane resin is interposed between and bonded to the innermost of said structural sheet members and said inner surface sheet.

20. A window according to claim 17, wherein said outer protective sheet is a fused acrylic polycarbonate.

21. A window according to claim 20, wherein an inner surface sheet of acrylic resin is disposed on the opposite side of said pair of structural sheet members from said outer protective sheet and a third interlayer of polyurethane resin is disposed between and bonded to said innermost of said structural sheet members and to said inner surface sheet.

22. A window according to claim 17, wherein a third structural sheet member of polycarbonate resin is disposed on the opposite side of said pair of structural sheet members from said outer protective sheet and a third interlayer of polyurethane resin is disposed between and bonded to the innermost of said structural sheet members and said third structural sheet member wherein said third structural sheet member and said third interlayer extend beyond the edge of said outer protective sheet and have spaced apertures aligned with said spaced apertures.

23. A window according to claim 22, wherein said outer protective sheet is acrylic resin.

24. A window according to claim 17, wherein an inner surface sheet of polycarbonate resin is disposed on the opposite side of said structural sheet members from said outer protective sheet and a fourth interlayer of polyurethane resin is interposed between and bonded to said third structural sheet member and said inner surface sheet.

25. A window according to claim 17, wherein the polyurethane resin is the reaction product of an organic diisocyanate, a polyester diol having an average molecular weight of between 750 and 5000 and an aliphatic diol having from 2 to 15 carbon atoms.

26. A window according to claim 25, wherein the diisocyanate is 4,4'-methylene-bis-(cyclohexyl-isocyanate).

27. A window according to claim 26, wherein the polyester diol is poly(1,4-butylene adipate).

28. A window according to claim 26, wherein the aliphatic diol is 1,4-butane diol.

29. A window according to claim 25, wherein the diisocyanate is 4,4'-methylene-bis-(cyclohexyl-isocyanate), the polyester diol is poly(1,4-butylene adipate) and the aliphatic diol is 1,4-butane diol.

30. A window according to claim 15, wherein said interlayer material is free of internal reinforcement in said peripheral margins.

31. A window according to claim 15, wherein an inner surface sheet or ply of an abrasion resistant, chemical resistant and thermal resistant material selected from the group consisting of glass and plastic is disposed on the opposite side of said pair of structural sheet members from said outer protective sheet and a third interlayer of polyurethane resin is disposed between and bonded to said innermost of said structural sheet members and to said inner surface sheet.

32. A window according to claim 31, wherein said inner surface sheet is acrylic resin.

33. A window according to claim 15, wherein said outer protective sheet is glass.

34. A window according to claim 15, wherein said outer protective sheet is fused acrylic/polycarbonate.

35. A window according to claim 22, wherein said outer protective sheet is glass.

36. A window according to claim 22, wherein said outer protective sheet is fused acrylic/polycarbonate.

* * * * *

UNITED STATES PATENT AND TRADEMARK OFFICE
CERTIFICATE OF CORRECTION

PATENT NO. : 4,081,581
DATED : March 28, 1978
INVENTOR(S) : Harry E. Littell, Jr.

It is certified that error appears in the above-identified patent and that said Letters Patent are hereby corrected as shown below:

Column 7, line 14, "merberis" should be --member is--.

Column 8, line 22, "approximately0.125" should be --approximately 0.125--.

Column 13, line 3, "1/4 inch" should be --3/4 inch--.

Signed and Sealed this

Twenty-first Day of November 1978

[SEAL]

Attest:

RUTH C. MASON
Attesting Officer

DONALD W. BANNER
Commissioner of Patents and Trademarks